(12) United States Patent
Harms

(10) Patent No.: US 9,877,096 B2
(45) Date of Patent: Jan. 23, 2018

(54) PORTABLE SPEAKER MOUNT

(71) Applicant: Thomas Henry Harms, Palm Beach Gardens, FL (US)

(72) Inventor: Thomas Henry Harms, Palm Beach Gardens, FL (US)

( * ) Notice: Subject to any disclaimer, the term of this patent is extended or adjusted under 35 U.S.C. 154(b) by 0 days.

(21) Appl. No.: 15/007,429

(22) Filed: Jan. 27, 2016

(65) Prior Publication Data
US 2017/0214989 A1  Jul. 27, 2017

(51) Int. Cl.
*H04R 1/02* (2006.01)
*F16M 13/02* (2006.01)
*F16B 47/00* (2006.01)

(52) U.S. Cl.
CPC ............. *H04R 1/026* (2013.01); *F16B 47/00* (2013.01); *F16M 13/022* (2013.01)

(58) Field of Classification Search
CPC ......... H04R 1/026; H04R 1/025; F16B 47/00; F16B 47/006; F16M 13/022; F16M 13/00; F16M 2200/00; F16M 13/08; A47G 1/17
USPC ...... 248/206.3, 309.1, 146, 156, 316.1, 313, 248/312
See application file for complete search history.

(56) References Cited

U.S. PATENT DOCUMENTS

| | | | |
|---|---|---|---|
| 1,531,694 A * | 3/1925 | Downing | B60J 3/02 116/28 R |
| 2,494,881 A * | 1/1950 | Kost | F16L 3/13 248/223.41 |
| 2,532,244 A * | 11/1950 | Pasmore | A47G 23/0266 211/85.18 |
| 3,780,972 A * | 12/1973 | Brodersen | A62C 13/78 211/85.18 |
| 3,880,389 A | 4/1975 | Burris | |
| 4,567,959 A * | 2/1986 | Prophit | H04R 1/2819 181/141 |
| D302,518 S | 8/1989 | Ellison | |
| 4,928,787 A * | 5/1990 | Kato | B60R 11/0217 181/141 |

(Continued)

OTHER PUBLICATIONS

2015 New Hot Selling Pill Mini Audio Bluetooth Wireless Doll Bracket Pill Speaker Bluetooth Speaker Audio Player Dhl Buy Speakers Online Car Speakers for Sale From Andyzoeyang, $19.91 Dhgate.Com. (n.d.). Retrieved Jan. 27, 2016, from http://www.dhgate.com/product/2015-new-hot-selling-pill-mini-audio-bluetooth/246600270.html#s1-0-1b; searl|2752270632.

(Continued)

*Primary Examiner* — Nkeisha Smith
(74) *Attorney, Agent, or Firm* — Dunlap Bennett & Ludwig PLLC

(57) ABSTRACT

A portable speaker mount is provided. The portable speaker mount includes a base plate having a front surface, a rear surface, an upper edge, a lower edge, a first side edge, and a second side edge. At least one upper flange arm extends from the upper edge of the base plate and curves towards the lower edge. At least one lower flange arm extends from the lower edge of the base plate and curves towards the upper edge. The lower flange arm includes a first clearance portion disposed in between an outer edge of the lower flange arm. The first clearance portion is positioned to align with a control and port region of a speaker. A cylinder shaped space is formed in between the upper flange arm and the at lower flange arm and is sized to snuggly fit the speaker in between.

11 Claims, 5 Drawing Sheets

(56) References Cited

U.S. PATENT DOCUMENTS

| | | | |
|---|---|---|---|
| 4,928,914 A | 5/1990 | Snodell | |
| 5,159,712 A | 10/1992 | Schneider et al. | |
| 5,191,177 A * | 3/1993 | Chi | B60R 11/0217 181/153 |
| 5,362,022 A * | 11/1994 | McLoughlin | A62B 25/00 224/262 |
| D363,210 S | 10/1995 | Scanlan et al. | |
| D375,718 S | 11/1996 | Lazzeroni et al. | |
| 5,657,954 A * | 8/1997 | Emery | A47K 1/09 248/206.3 |
| 6,010,102 A * | 1/2000 | Dillion, Jr. | B60R 11/00 248/206.3 |
| 6,220,557 B1 * | 4/2001 | Ziaylek | A62C 13/78 248/154 |
| 6,305,241 B1 | 10/2001 | Masui et al. | |
| 6,450,463 B1 * | 9/2002 | Mc Cord | F17C 13/084 248/146 |
| 6,665,524 B1 * | 12/2003 | Niemann | H04B 1/3888 248/309.1 |
| 6,729,598 B2 * | 5/2004 | Folliot | B60N 2/0232 248/671 |
| 6,798,892 B2 | 9/2004 | Parnell | |
| 6,932,255 B2 * | 8/2005 | Van Houtte | B62J 11/00 224/414 |
| 7,216,721 B2 * | 5/2007 | Jacobson | A62C 13/78 169/30 |
| 7,669,742 B2 * | 3/2010 | Rush | A45F 5/00 102/336 |
| D622,699 S | 8/2010 | Jiang et al. | |
| 7,805,135 B2 | 9/2010 | Struthers et al. | |
| 7,918,204 B2 * | 4/2011 | Gignac | B01D 35/30 123/195 A |
| 8,090,137 B2 | 1/2012 | Ryan | |
| 8,315,048 B2 | 11/2012 | Tarnoff | |
| 8,333,261 B2 | 12/2012 | Barnes | |
| D673,477 S | 1/2013 | Szellos | |
| D687,810 S | 8/2013 | Son et al. | |
| 8,651,350 B2 | 2/2014 | Onogi | |
| 8,780,553 B2 | 7/2014 | Palmer et al. | |
| D710,340 S | 8/2014 | Wengreen et al. | |
| 8,861,714 B1 | 10/2014 | Leibenhaut et al. | |
| 8,971,560 B2 | 3/2015 | Lyons et al. | |
| 8,998,048 B1 | 4/2015 | Wu | |
| 9,003,626 B2 | 4/2015 | Carnevali | |
| 2004/0051503 A1 * | 3/2004 | Fan | H04M 1/6041 320/117 |
| 2004/0099775 A1 * | 5/2004 | Zheng | B60R 11/02 248/206.3 |
| 2011/0170256 A1 | 7/2011 | Lee | |
| 2012/0033375 A1 | 2/2012 | Madonna et al. | |
| 2014/0313657 A1 * | 10/2014 | Kumar | G06F 1/1632 361/679.11 |
| 2015/0077928 A1 | 3/2015 | Williams | |
| 2015/0195634 A1 | 7/2015 | Gartlo et al. | |

OTHER PUBLICATIONS

Beats Bike Mount for Pill Portable Speaker (Black). (n.d.). Retrieved Jan. 27, 2016, from http://www.amazon.com/Beats-Mount-Portable-Speaker-Black/dp/B00G3SNCGM/ref=sr_1_1?ie=UTF8.

Butterworth, B. (Jan. 28, 2013). Review: NYNE NB-200 Bluetooth speaker. Retrieved Jan. 27, 2016, from http://www.soundandvision.com/content/review-nyne-nb-200-bluetooth-speaker.

* cited by examiner

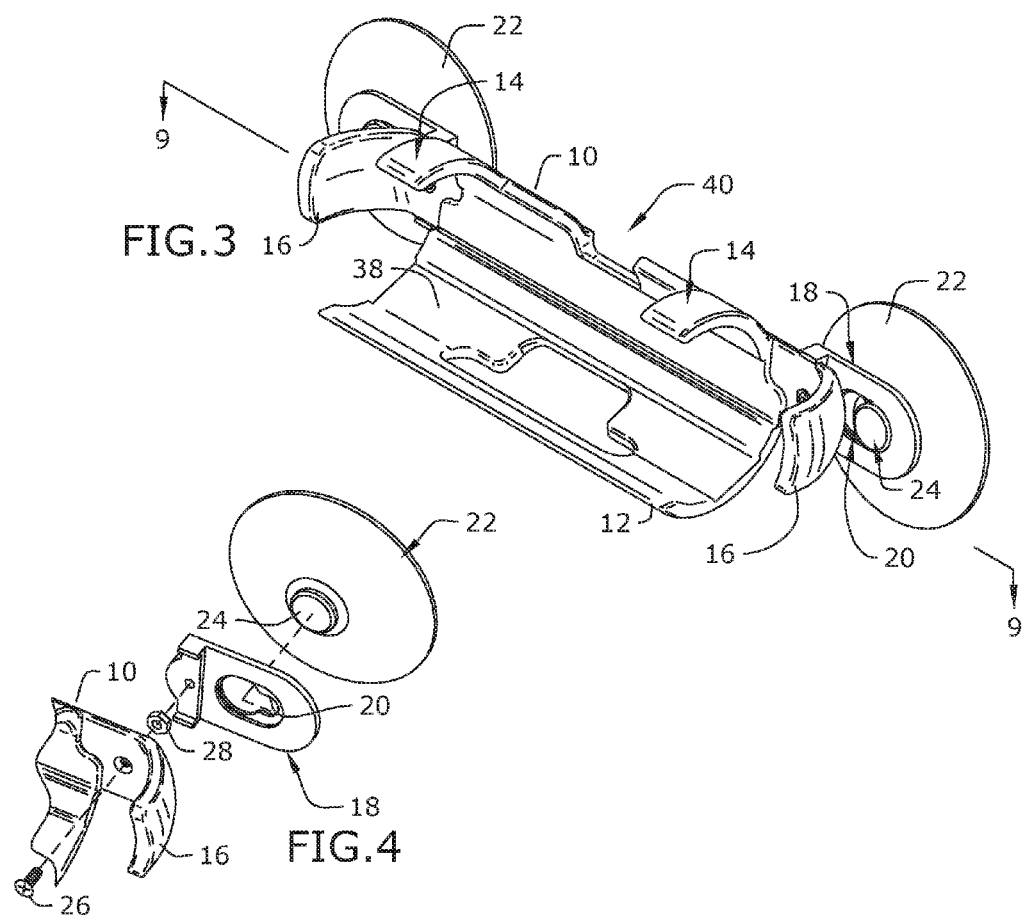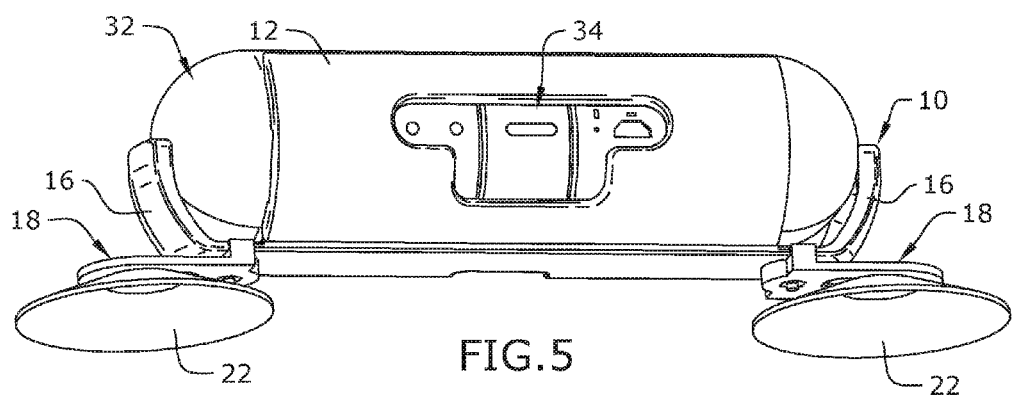

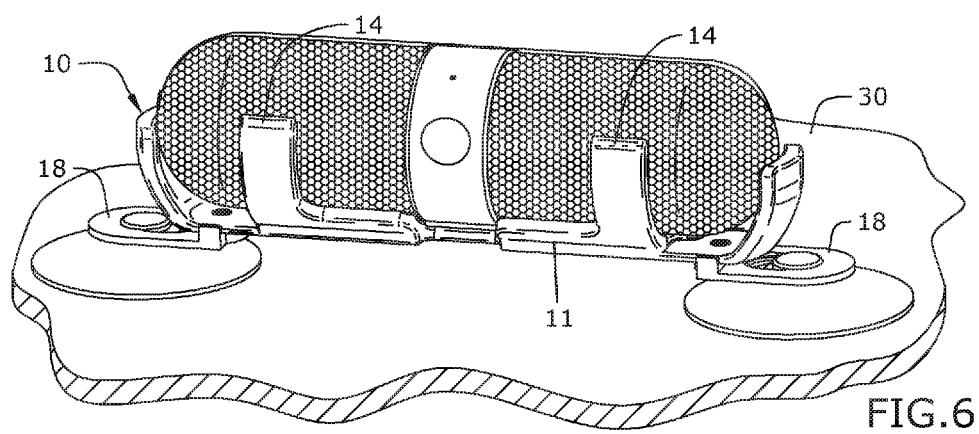
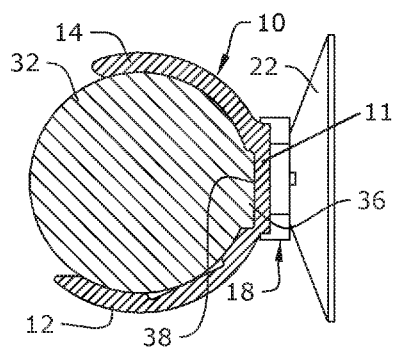
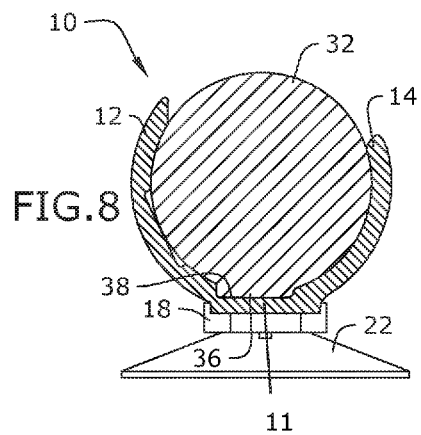
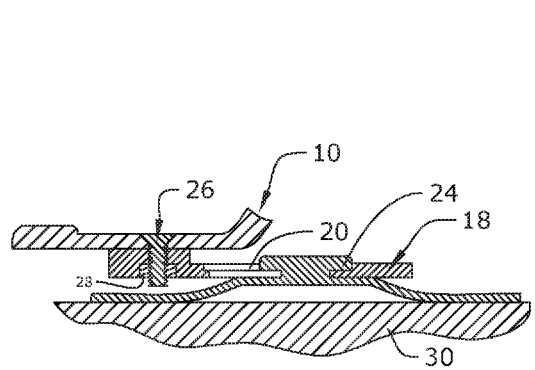
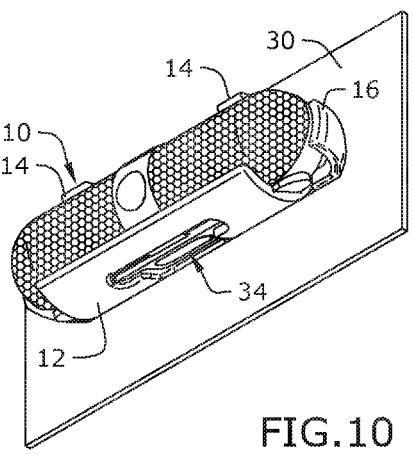

PORTABLE SPEAKER MOUNT

BACKGROUND OF THE INVENTION

The present invention relates to portable speakers and, more particularly, to a portable speaker mount that exposes the speaker's ports and control buttons.

Beats Pill® is a line of portable, Bluetooth® speakers produced by Beats Electronics®. The Pill is distinguished by its capsule-like form factor. The Pill uses Bluetooth® to connect to a device (such as a smartphone), and also supports near-field communication for device pairing. It also includes 3.5 mm audio input and output jacks. The Pill® charges over a micro USB port, and comes with a USB AC adapter. The device also includes a microphone so it can be used as a speakerphone.

A portable speaker, such as Beats Pill®, is used in many different environments (i.e. a golf cart or small boat). Most of these environments do not have adequate places to position the speaker safely and securely. Current mounts for the Beats Pill® cover the speakers USB ports and control buttons. Without access to the ports and control buttons, the speaker is limited and eventually runs out of battery power.

As can be seen, there is a need for an improved mount that exposes speaker ports and control buttons.

SUMMARY OF THE INVENTION

In one aspect of the present invention, a portable speaker mount comprises: a base plate comprising a front surface, a rear surface, an upper edge, a lower edge, a first side edge, and a second side edge; at least one upper flange arm extending from the upper edge and curving towards the lower edge; at least one lower flange arm extending from the lower edge and curving towards the upper edge, wherein the at least one lower flange arm comprises a first clearance portion disposed in between an outer edge of the at least one lower flange arm and positioned to align with a control and port region of a speaker; and a mount operable to secure the base plate to a surface, wherein a cylinder shaped space is formed in between the at least one upper flange arm and the at least one lower flange arm.

These and other features, aspects and advantages of the present invention will become better understood with reference to the following drawings, description and claims.

BRIEF DESCRIPTION OF THE DRAWINGS

FIG. 3 is a perspective view of an embodiment of the present invention;

FIG. 4 is a detail exploded view of an embodiment a removable attachment of the present invention;

FIG. 5 is a perspective view of an embodiment of the present invention showing access to the power button, charging port, and 3.5 mm audio in and out ports;

FIG. 6 is a perspective view of an embodiment of the present invention shown in use affixed to a horizontal surface;

FIG. 7 is a section view of the present invention along line 7-7 in FIG. 1;

FIG. 8 is a section view of the present invention along line 7-7 in FIG. 1;

FIG. 9 is a section view of the present invention along line 9-9 in FIG. 3;

FIG. 10 is a perspective view of an embodiment of the present invention illustrating a more permanent attachment to a surface as well as the access to the USB port of the speaker;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a multi-positional mount for the Beats Pill® portable speaker. The mount of the present invention utilizes a cradle for the speaker to nest in, as well as various mounting attachments such as screws, suction cups, or hook and loop fasteners. Further, the mount allows access to all features of the speaker regardless of the orientation.

Figure 1:
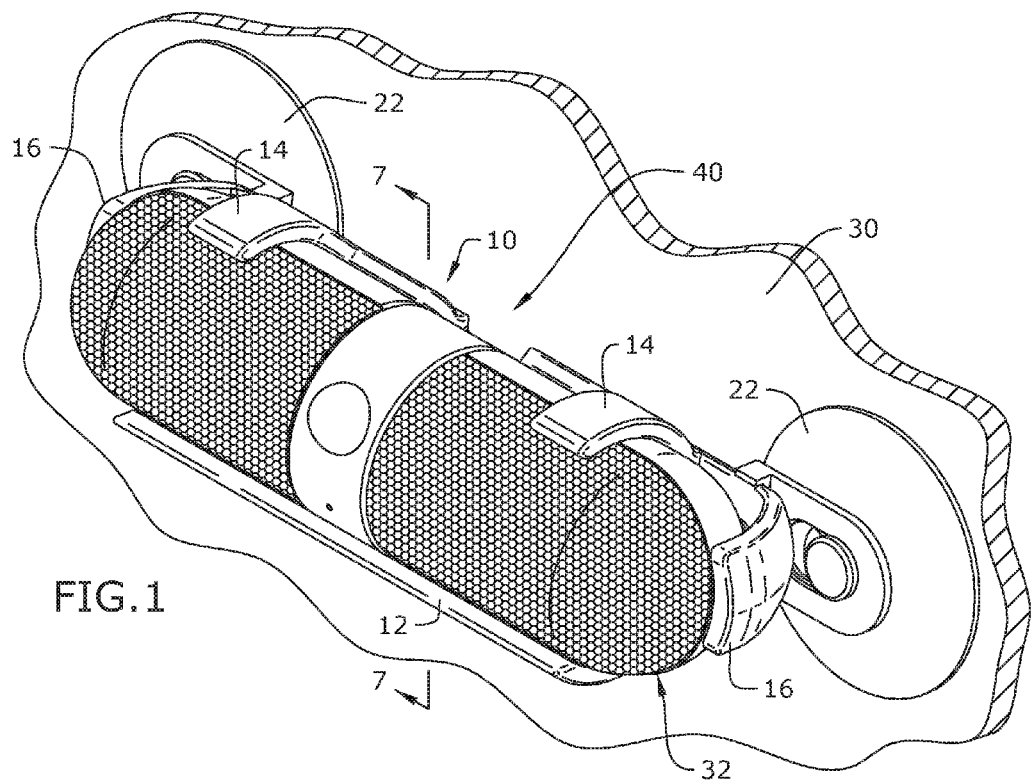
FIG. 1 is a perspective view of an embodiment of the present invention shown in use affixed to a vertical surface.
Figure 2:
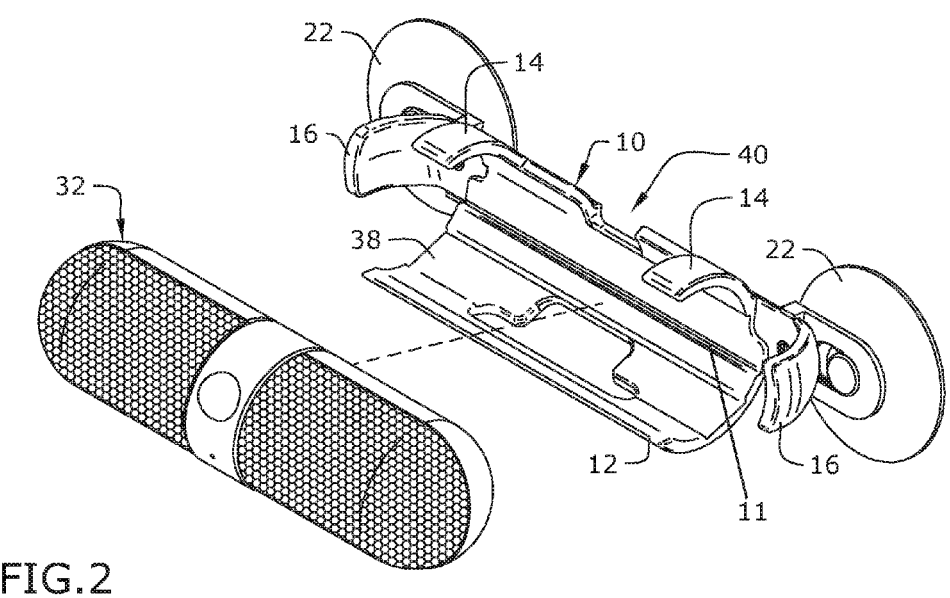
FIG. 2 is an exploded view of an embodiment of the present invention shown in use affixed to a vertical surface.
Figure 11:
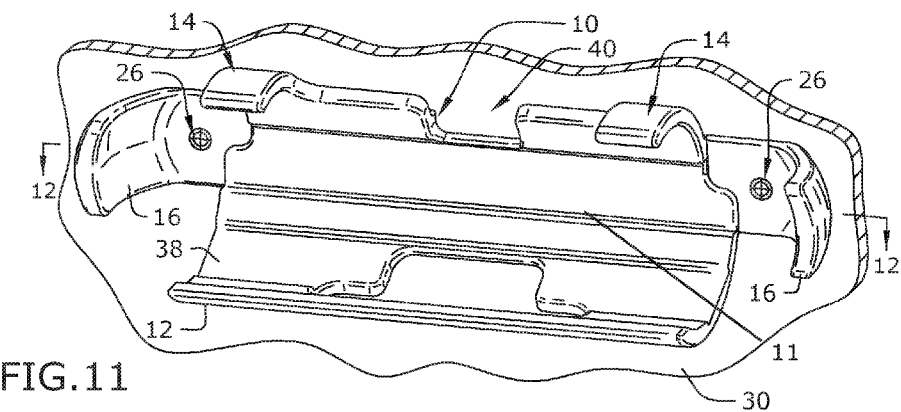
FIG. 11 is a perspective view of an embodiment of the present invention shown with an alternate placement method.
Figure 12:
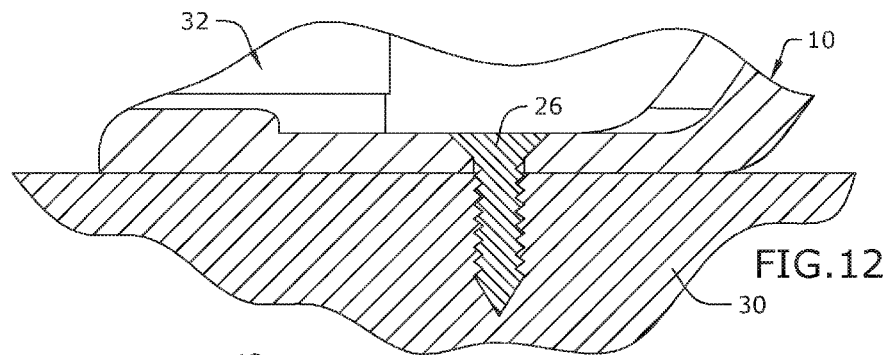
FIG. 12 is a section detail view of the present invention along line 12-12 in FIG. 11.
Figure 13:
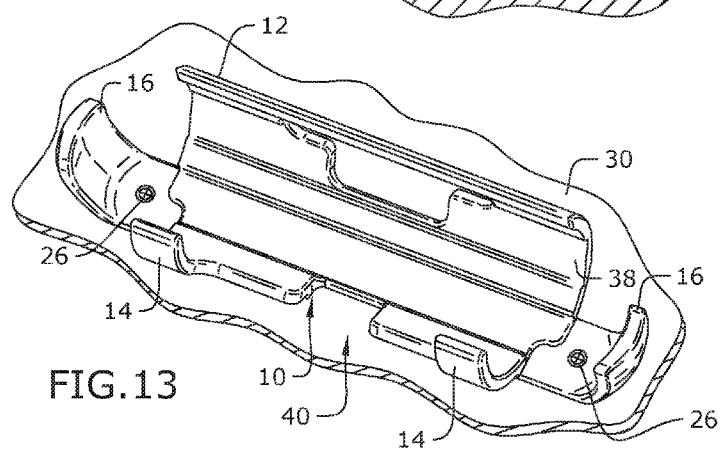
FIG. 13 is a perspective view demonstrating an embodiment of the present invention placed on a flat horizontal surface.
Figure 14:
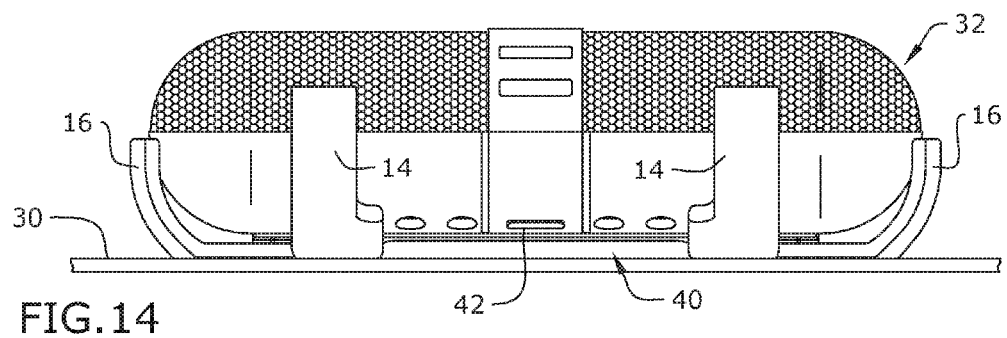
FIG. 14 is a top view of an embodiment of the present invention illustrating power button access to the speaker.
Figure 15:
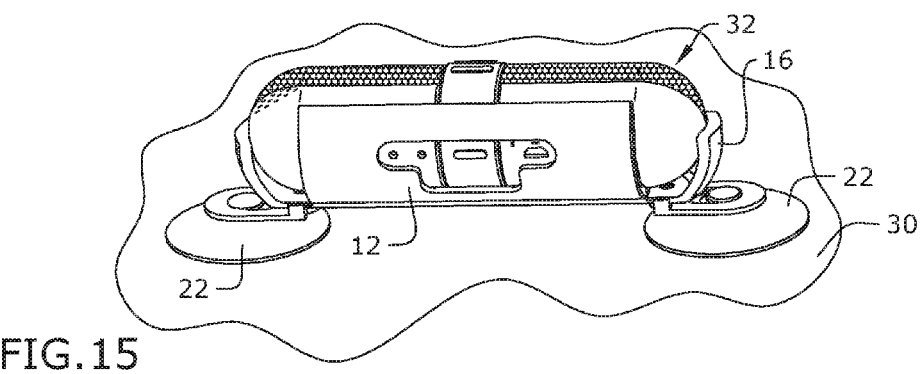
FIG. 15 is a perspective view illustrating the speaker on a flat horizontal surface.
Figure 16:
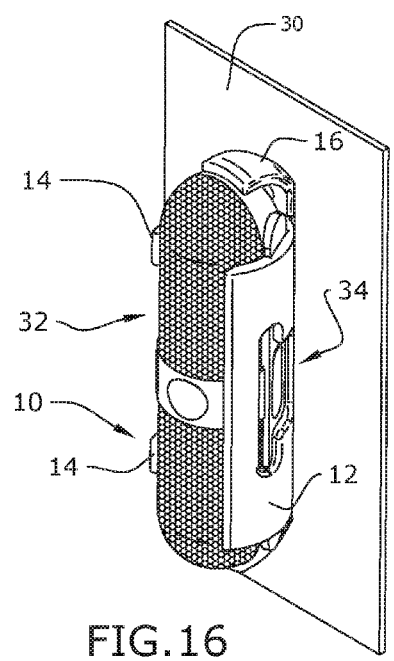
FIG. 16 is a perspective of an embodiment of the present invention illustrating port access of the speaker on a vertical mounted surface.

Referring to FIGS. 1 through 16, the present invention includes a portable speaker mount 10. The portable speaker mount 10 includes a base plate 11 having a front surface, a rear surface, an upper edge, a lower edge, a first side edge, and a second side edge. At least one upper flange arm 14 extends from the upper edge of the base plate 11 and curves towards the lower edge. At least one lower flange arm 12 extends from the lower edge of the base plate 11 and curves towards the upper edge. The lower flange arm 12 includes a first clearance portion disposed in between an outer edge of the lower flange arm 12. The first clearance portion is positioned to align with a control and port region 34 of a speaker 32. A cylinder shaped space is formed in between the upper flange arm 14 and the at lower flange arm 12 and is sized to snuggly fit the speaker 32 in between. A connector is operable to secure the base plate 11 to a surface 30 in a vertical or horizontal position.

In certain embodiments, the present invention includes a first side flange 16 extending from the first side edge and curving towards the second side edge, and a second side flange arm 16 extending from the second side edge and curving towards the first side edge. The space formed in between the first side flange 16, the second side flange 16, the upper flange arm 14 and the lower flange arm 12 may form a capsule shape to fit a Beats Pill® snuggly in between.

The at least one upper flange arm 14 may include a first upper flange arm 14 and a second upper flange arm 14. The first upper flange arm 14 may extend from the upper edge of the base plate 11 near the first side edge. The second upper flange arm 14 may extend from the upper edge of the base plate 11 near the second side edge. In such embodiments, a second clearance portion may be formed. The second clearance portion may extend from the upper edge towards the lower edge, forming a square notch 40. The second clearance portion may be disposed in between the first upper flange arm 14 and the second upper flange arm 14. The second clearance portion may be positioned to align with a power button 42 of the speaker 32, thereby exposing the power button 42 when the speaker 32 is within the portable speaker mount 10.

The portable speaker mount 10 of the present invention may be made to secure the Beats Pill® to a surface 30. Therefore, the first clearance portion may include an opening that provides clearance to the control and port region 34 of the Beats Pill®. Further, the second clearance portion may include an opening that provides clearance to the power button 42 of the Beats Pill®. In certain embodiments, the present invention may further includes a locking slot 38 formed on the front surface of the base plate 11. The locking slot 38 may run from the first side edge to the second side edge. The Beats Pill® may include a locking ridge 36 protruding from the rear surface. The locking slot 38 is sized to receive and retain the locking ridge 36 of the Beats Pill® speaker.

In certain embodiments, the base plate 11 may include bolt apertures formed therethrough. For example, the base plate 11 may include a first aperture formed near the first side edge and a second aperture formed near the second side edge. In such embodiments, the connector may include a threaded fastener 26 sized to fit through the apertures and into a surface 30, thereby securing the portable speaker mount 10 to the surface 30.

In certain embodiments, the present invention may include mount brackets 18 secured to the rear surface of the base plate 11. Each mount bracket 18 may include an aperture that aligns with the apertures formed through the base plate 11. The threaded fastener 26 may run through the aligned apertures and a threaded nut 28 may be secured to the end of the threaded fastener 26, thereby connecting the mount bracket 18 to the base plate 11. In certain embodiments, a mount bracket 18 may be secured to the base plate 11 near the first side edge and the second side edge. Each of the mount brackets 18 may include a mount bracket slot 20. A suction cut head 24 may be secured within the bracket slot 20, thereby securing a suction cup 22 to either side of the base plate 11. The suction cups 22 may releasably retain the portable speaker mount 10 to the surface 30.

The portable speaker mount 10 may be made of a plastic material. A method of making the present invention may include the following. An injection molding die set is fabricated out of stainless steel via a CNC Milling machine or similar. Once the die sets are made, an injection molding machine injects Acrylonitrile butadiene styrene (ABS) or similar plastic into the voids to produce a solid plastic final product.

It should be understood, of course, that the foregoing relates to exemplary embodiments of the invention and that modifications may be made without departing from the spirit and scope of the invention as set forth in the following claims.

What is claimed is:
1. A portable speaker mount comprising:
a base plate comprising a front surface, a rear surface, an upper edge, a lower edge, a first side edge, and a second side edge, wherein the base plate comprises an elongated width running from the first side edge to the second side edge;
at least one upper flange arm extending from the upper edge and curving towards the lower edge;
a lower flange arm extending from the lower edge and extending along the elongated width of the base plate, wherein the lower flange arm curves towards the upper edge, wherein an opening is formed by an inner edge of the lower flange arm forming a first clearance portion for a control and port region of a speaker;
a first side flange arm extending from the first side edge and curving towards the second side edge;
a second side flange arm extending from the second side edge and curving towards the first side edge; and
a connector operable to secure the base plate to a surface, wherein
a cylinder shaped space is formed in between the at least one upper flange arm, the first side flange arm, the second side flange arm and the lower flange arm.

2. The portable speaker mount of claim 1, wherein the at least one upper flange arm comprises a first upper flange arm and a second upper flange arm extending from opposing sides of the upper edge.

3. The portable speaker mount of claim 2, further comprising a second clearance portion extending from the upper edge towards the lower edge and disposed in between the first upper flange arm and the second upper flange arm, wherein the second clearance portion is positioned to align with a power button of the speaker.

4. The portable speaker mount of claim 1, wherein the connector comprises at least one mount bracket secured to the rear surface of base plate, and a suction cup secured within a mount bracket slot formed through the mount bracket.

5. The portable mount of claim 4, wherein the at least one mount bracket comprises an aperture aligning with an aperture formed through the base plate, wherein a threaded fastener runs through the aligned apertures, thereby securing the at least one mount bracket to the base plate.

6. The portable speaker mount of claim 4, wherein the at least one mount bracket comprises a first mount bracket secured to the rear surface near the first side edge and a second mount bracket secured to the rear surface near the second side edge.

7. The portable speaker mount of claim 1, wherein the connector comprises at least one bolt running through at least one opening formed through the base plate and into the surface.

8. The portable speaker mount of claim 7, wherein the at least one bolt comprises a first bolt running through a first opening formed through the base plate near the first side edge, and a second bolt running through a second opening formed through the base plate near the second side edge.

9. The portable speaker mount of claim 1, further comprising a locking slot formed on the front surface of the base plate running from the first side edge to the second side edge, wherein the locking slot is formed to receive a locking ridge formed on the speaker.

10. A portable speaker mount comprising:
a base plate comprising a front surface, a rear surface, an upper edge, a lower edge, a first side edge, and a second side edge, wherein the base plate comprises an elongated width running from the first side edge to the second side edge;

a first upper flange arm and a second upper flange arm extending from opposing sides of the upper edge and each curving towards the lower edge;

a lower flange arm extending from the lower edge and extending along the elongated width of the base plate, wherein the lower flange arm curves towards the upper edge, wherein an opening is formed by an inner edge of the lower flange arm forming a clearance portion for a control and port region of a speaker; and a connector operable to secure the base plate to a surface, wherein a cylinder shaped space is formed in between the first upper flange arm, the second upper flange arm and the lower flange arm.

11. A portable speaker mount comprising:

a base plate comprising a front surface, a rear surface, an upper edge, a lower edge, a first side edge, and a second side edge, wherein the base plate comprises an elongated width running from the first side edge to the second side edge;

at least one upper flange arm extending from the upper edge and curving towards the lower edge;

a lower flange arm extending from the lower edge and extending along the elongated width of the base plate, wherein the lower flange arm curves towards the upper edge, wherein an opening is formed by an inner edge of the lower flange arm forming a clearance portion for a control and port region of a speaker; and a connector operable to secure the base plate to a surface, wherein a locking slot is formed on the front surface of the base plate running from the first side edge to the second side edge, wherein the locking slot is formed to receive a locking ridge formed on the speaker, and a cylinder shaped space is formed in between the at least one upper flange arm and the lower flange arm.

* * * * *